United States Patent

Gleiter

[11] 4,098,232
[45] Jul. 4, 1978

[54] PRE-CHAMBER IN THE CYLINDER HEAD OF AN INTERNAL COMBUSTION ENGINE WITH APPLIED IGNITION

[75] Inventor: Fritz Gleiter, Pleidelsheim, Fed. Rep. of Germany

[73] Assignee: Dr. Ing. h.c.F. Porsche Aktiengesellschaft, Fed. Rep. of Germany

[21] Appl. No.: 738,902

[22] Filed: Nov. 4, 1976

[30] Foreign Application Priority Data

Nov. 7, 1975 [DE] Fed. Rep. of Germany ....... 2549933

[51] Int. Cl.² .......................... F02B 3/00; F02B 23/00
[52] U.S. Cl. ............................ 123/32 ST; 123/32 SP; 123/191 S
[58] Field of Search ............ 123/32 ST, 32 SP, 32 K, 123/32 L, 75 B, 191 S, 191 SP

[56] References Cited

U.S. PATENT DOCUMENTS

| | | | |
|---|---|---|---|
| 1,550,570 | 8/1925 | Romeiser et al. | 123/191 SP |
| 1,596,240 | 8/1926 | Dikeman | 123/191 S |
| 2,059,243 | 11/1936 | Kennedy | 123/32 SP |
| 2,231,173 | 2/1941 | Starr | 123/32 SP |
| 3,058,452 | 10/1962 | Espenschied | 123/32 SP |
| 3,799,140 | 3/1974 | Vogelsang et al. | 123/191 S |
| 3,890,940 | 6/1975 | List | 123/32 SP |
| 3,918,419 | 11/1975 | Dolza, Sr. | 123/32 ST |
| 4,006,720 | 2/1977 | Sato et al. | 123/32 ST |

FOREIGN PATENT DOCUMENTS

744,554  2/1956  United Kingdom ................ 123/32.9

Primary Examiner—Charles J. Myhre
Assistant Examiner—Parshobam S. Lall
Attorney, Agent, or Firm—Craig & Antonelli

[57] ABSTRACT

A pre-chamber in the cylinder head of an internal combustion engine with applied ignition, whereby the pre-chamber which includes an opening for the spark plug and at least one opening leading to the main combustion space is constructed as a structural part separate from and mounted in the cylinder head, and whereby the fuel-air mixture is supplied to the pre-chamber by way of an injection nozzle; the pre-chamber is thereby arranged in an opening of the cylinder head which, at least section-wise, becomes wider in the direction to the main combustion space and is fixed in the opening of the cylinder head by fastening means arranged substantially coaxially to the injection nozzle center plane.

11 Claims, 4 Drawing Figures

PRE-CHAMBER IN THE CYLINDER HEAD OF AN INTERNAL COMBUSTION ENGINE WITH APPLIED IGNITION

The present invention relates to a pre-chamber in the cylinder head of an internal combustion engine with external auto-ignition or applied ignition, especially to a pre-chamber of a stratified-charge engine, whereby the pre-chamber provided with an opening for the spark plug and with at least one opening toward the main combustion space is constructed as separate structural part in the cylinder head, and fuel-air mixture is supplied to the pre-chamber by way of an injection nozzle.

A pre-chamber of the aforementioned type for a stratified-charge engine with applied ignition is known in the art (German Offenlegungsschrift No. 2,037,532) which includes a cover part threadably connected with the cylinder head, into which are inserted the injection nozzle and the spark plug. The other part of the pre-chamber is formed by an insert of heat-insulating or heat-storing material, in which are provided connecting openings leading to the main combustion space. Since the injection nozzle, on the one hand, and the connecting openings, on the other, are arranged in different structural parts, the exact positioning of the injection nozzle with respect to the connecting openings is not assured by reason of the manufacturing tolerances. However, tests have demonstrated that precisely this engine internal parameter has a significant influence on the exhaust gas emission, the fuel consumption and the operating behavior of a stratified-charge engine with applied ignition.

It is the aim of the present invention to provide a pre-chamber in the cylinder head of an internal combustion engine with applied ignition, especially a pre-chamber of a stratified-charge engine, in which as a result of the position of the injection nozzle with respect to the opening or openings forming the so-called firing channel or channels between the pre-chamber and the main combustion chamber, no negative influence is possible on the exhaust gas emission, on the fuel consumption and on the operating behavior of the internal combustion engine.

The underlying problems are solved according to the present invention in that the pre-chamber is arranged in an opening of the cylinder head which becomes wider at least section-wise in the direction toward the main combustion space, and is fixed in the opening by fastening means arranged coaxial to the injection nozzle center plane.

One appropriate construction of the present invention resides, inter alia, in that the opening includes a cylindrical portion, and in that the opening portion which becomes wider in the direction toward the main combustion space, is constructed conically shaped, whereby the pre-chamber constructed corresponding to the opening includes within the area of the main combustion space a spherically shaped closure, is open at the end-face within the area of the cylindrical portion of the opening and the pre-chamber is threadably connected with the injection nozzle within this area by an internal thread and is fixed in the opening by an external thread by means of a counter-nut cooperating with a plane of the cylinder head extending at right angle to the injection nozzle center plane.

A further embodiment resides in that the opening includes a cylindrical portion, and the portion which becomes wider in the direction toward the main combustion space is constructed conically shaped, whereby the pre-chamber constructed corresponding to the opening includes a conically shaped closure within the area of the main combustion space, is open within the area of the cylindrical portion of the opening at the end face thereof, and the pre-chamber is threadably connected within this area with the injection nozzle by an internal thread and is so dimensioned at the end face thereof that an air gap remains in the assembled condition between a support disk abutting at a shoulder or offset of the injection nozzle, on the one hand, and at a plane of the cylinder head extending at right angle to the injection nozzle center plane, on the other, and the end face of the pre-chamber so that the pre-chamber is fixed in the opening by the injection nozzle resting on the support disk by means of the offset or shoulder. The pre-chamber is thereby secured in the circumferential direction within the cylinder head by a locking pin arranged axially parallel to the injection nozzle in the plane formed by the circumferential surface of the pre-chamber and the circumferential surface of the opening. It has also proved as advantageous that the opening includes a cylindrical portion, and the portion which becomes wider in the direction toward the main combustion space is constructed conically shaped whereby the pre-chamber constructed corresponding to the opening includes a spherically shaped closure within the area of the main combustion space, is open at the end face within the area of the cylindrical portion of the opening and the pre-chamber is threadably connected within this area with the injection nozzle by an internal thread and is fixed in the opening by an external thread by means of a counter-nut cooperating with a plane of the cylinder head extending at right angle to the injection nozzle center plane, whereby in both embodiments with a counter-nut, a nut locking device of any conventional construction is arranged between the counter-nut and the plane of the cylinder head.

The advantages achieved with the present invention consist especially in that after a completed disassembly, the injection nozzle always assumes the same position with respect to the corresponding firing channels in case of a renewed assembly by reason of the fastening means arranged coaxially to the injection nozzle. Therebeyond, as a result of the arrangement of the pre-chamber in an opening which, at least section-wise, becomes wider in the direction toward the main combustion space, the fastening means of the pre-chamber are not exposed to the combustion pressures of the internal combustion engine since the same are absorbed exclusively by the side walls of the opening in the cylinder head.

Accordingly, it is an object of the present invention to provide a pre-chamber in the cylinder head of an internal combustion engine with applied ignition which avoids by simple means the aforementioned shortcomings and drawbacks encountered in the prior art.

A further object of the present invention resides in a pre-chamber within the cylinder head of an internal combustion engine with applied ignition, in which an accurate positioning of the injection nozzle with respect to the connecting openings between the pre-chamber and the main combustion space is assured at all times, irrespective of the number of times the various parts are disassembled and reassembled.

A further object of the present invention resides in a pre-chamber arranged in the cylinder head of an internal combustion engine with applied ignition, which is so constructed by simple means that the exhaust gas emission, the fuel consumption and the operating behavior of the engine cannot be adversely affected by manufacturing tolerances or improper assembly of the pre-chamber.

Still a further object of the present invention resides in an internal combustion engine of the type described above in which the injection nozzles will always assume the same position relative to the corresponding firing channels provided in the pre-chamber notwithstanding the number of disassemblies and reassemblies which have been undertaken.

Another object of the present invention resides in an internal combustion engine of the type described above in which the fastening means of the pre-chamber are not exposed to the combustion pressures of the internal combustion engine since these pressures are absorbed exclusively by side walls of the opening provided in the cylinder head for the separate structural part of the pre-chamber.

These and other objects, features and advantages of the present invention will become more apparent from the following description when taken in connection with the accompanying drawing which shows, for purposes of illustration only, several embodiments in accordance with the present invention, and wherein.

Figure 3:
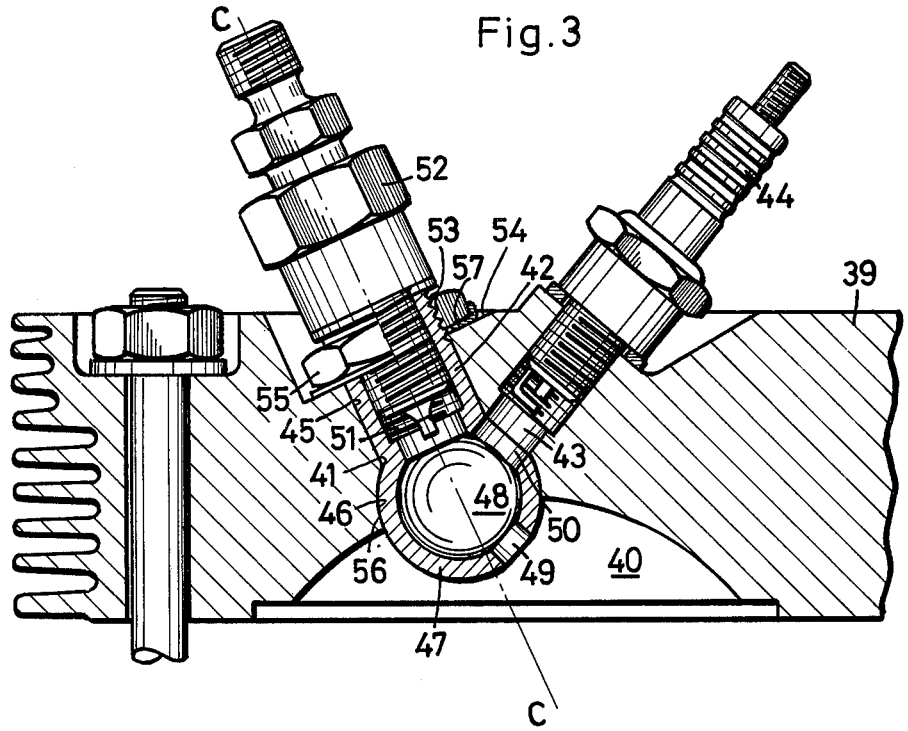
Figure 4:
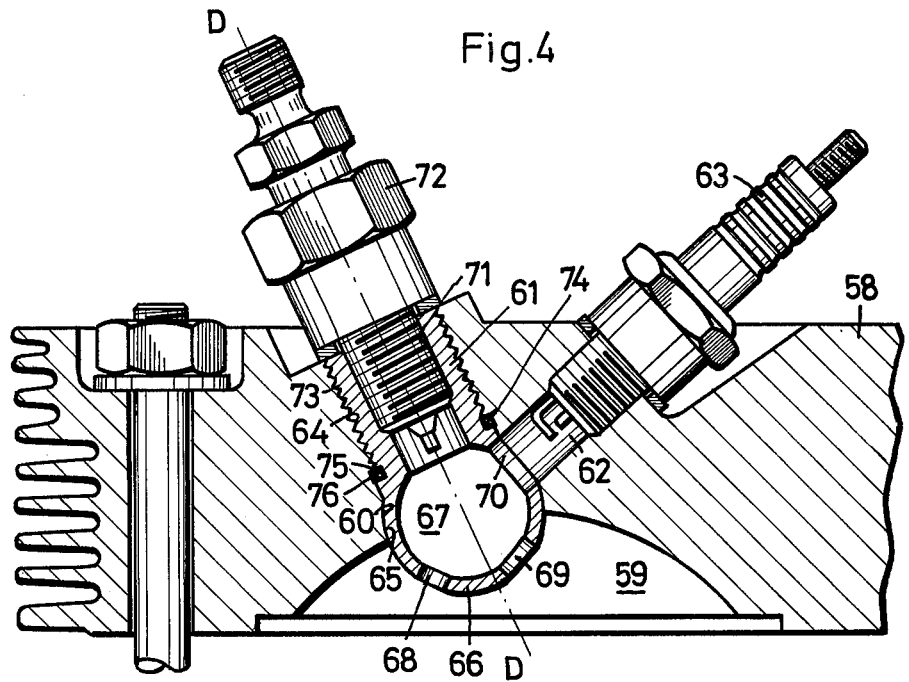

FIG. 3 is a partial cross-sectional view through a third embodiment of a cylinder head in accordance with the present invention with a pre-chamber provided with a pre-chamber space of spherical shape and a mounting by means of a fastening nut; and FIG. 4 is a partial cross-sectional view through a fourth embodiment of a cylinder head with a pre-chamber in accordance with the present invention provided with the pre-chamber space of spherical shape and a mounting by means of a thread in the cylinder head.

Figure 1:
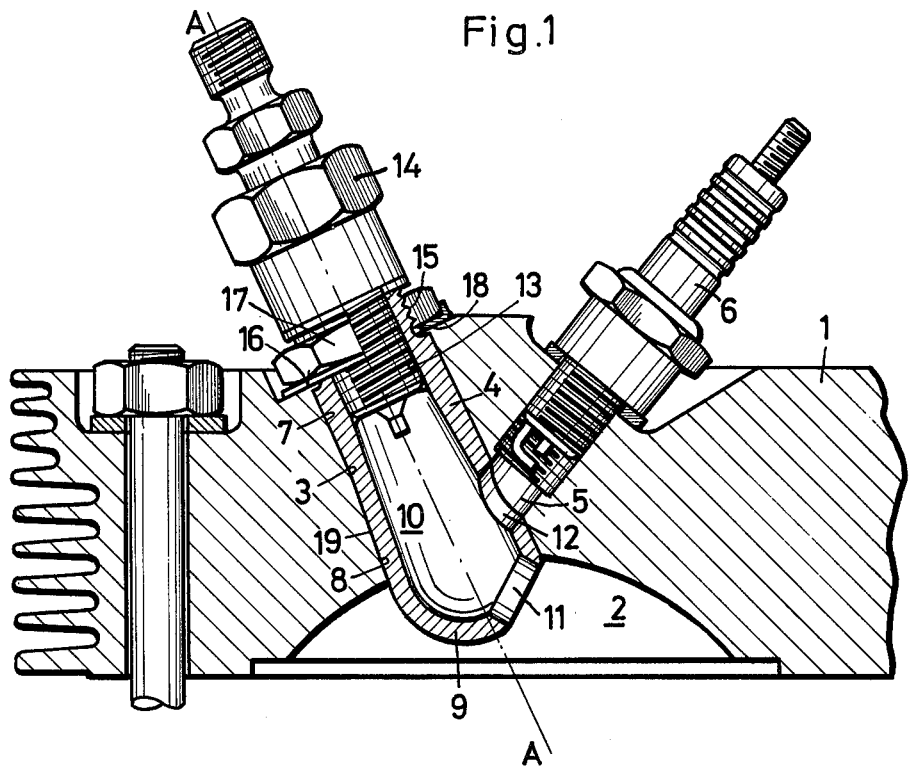
FIG. 1 is a partial cross-sectional view through the cylinder head of an internal combustion engine in accordance with the present invention provided with a pre-chamber having a conical fit and a mounting by means of a fastening nut.

Referring now to the drawing wherein like reference numerals are used throughout the various views to designate like parts, and more particularly to FIG. 1, in this figure reference numeral 1 designates a cylinder head which is provided with a main combustion space 2, with an opening 3 for the pre-chamber 4 and with an opening for the spark plug 6. The opening 3 includes a cylindrical portion 7 and a conical portion 8 which becomes wider in the direction toward the main combustion space 2, whereby the pre-chamber 4 constructed corresponding to the opening 3 is provided within the area of the main combustion space 2 with a spherically shaped closure 9. An opening 11, the so-called firing channel, is provided in the closure 9 which connects the pre-chamber combustion space 10 with the main combustion space 2. Within the conical portion 8 of the opening 3, the pre-chamber 4 is provided with an opening 12 connecting the opening 5 of the spark plug 6 with the pre-chamber combustion space 10, whereby the opening 5 and the opening 12 have approximately equally large diameters and are arranged approximately aligned with one another. Within the area of the cylindrical portion of the opening 3, the pre-chamber 4 is open at the end face thereof and is threadably connected within this area with the injection nozzle 14 by way of an internal thread 13. At the same time, the pre-chamber 4 is provided within this area with an external thread 15, by which the pre-chamber 4 is fixed in the opening 3 by means of a counter-nut 17 cooperating with a plane 16 of the cylinder head 1 extending at right angle to the injection nozzle center plane A—A, whereby the conical surface 19 of the pre-chamber 4 comes into abutment at the conical portion 8 of the opening 3. A nut-locking device 18 of conventional construction is arranged between the counter-nut 17 and the plane 16 of the cylinder head 1.

Figure 2:
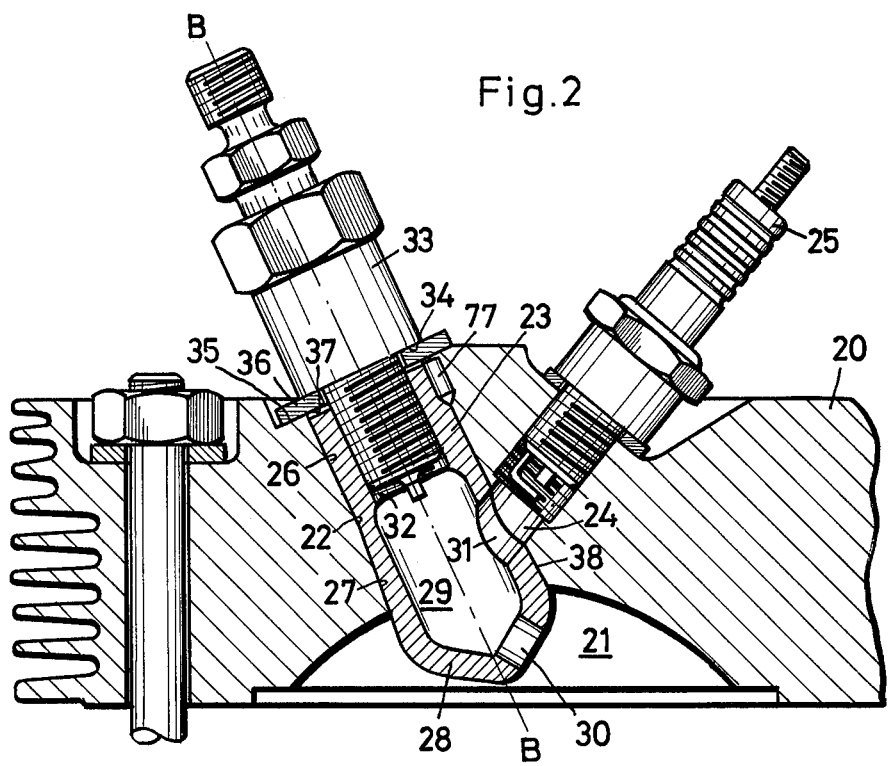
FIG. 2 is a partial cross-sectional view, similar to FIG. 1, through a second embodiment of a cylinder head in accordance with the present invention provided with a pre-chamber having a conical fit and a mounting by means of the injection nozzle.

In FIG. 2, reference numeral 20 designates a cylinder head which includes a main combustion space 21, an opening 22 for the pre-chamber 23 and an opening 24 for the spark plug 25. The opening 22 includes a cylindrical portion 26 and a conical portion 27 which becomes wider in the direction toward the main combustion space 21, whereby the pre-chamber 23 constructed corresponding to the opening 22 is provided with a conical closure 28 within the area of the main combustion space 21. An opening 30, the so-called firing channel, which connects the pre-chamber combustion space 29 with the main combustion space 21, is provided in the closure 28. In the conical portion 27 of the opening 26, the pre-chamber 23 is provided with an opening 31 connecting the opening 24 for the spark plug 25 with the pre-chamber combustion space 29, whereby the opening 24 and the opening 31 have approximately equally large diameters and are arranged approximately aligned to one another. Within the area of the cylindrical portion 26 of the opening 22, the pre-chamber 23 is open at the end face thereof and is threadably connected within this area with the injection nozzle 33 by means of an internal thread 32. At the end face, the pre-chamber 23 is so dimensioned than an air gap remains in the assembled condition between a support disk 36 that abuts at an offset or shoulder 34 of the injection nozzle 33, on the one hand, and at a plane 35 of the cylinder head 20 extending at right angle to the injection nozzle center plane B—B, on the other and the end face 37 of the pre-chamber 23, so that the pre-chamber 23 is fixed in the opening 22 by the injection nozzle 33 resting on the support disk 36 by means of the offset of shoulder 34, whereby the conical surface 38 of the pre-chamber 23 comes into abutment at the conical portion 27 of the opening 22. The pre-chamber 23 is secured in the circumferential direction within the cylinder head by a locking pin 77 arranged axially parallel to the injection nozzle center plane B—B in the plane formed by the circumferential surface of the pre-chamber 23 and the circumferential surface of the opening 22.

In the embodiment of FIG. 3, reference numeral 39 designates a cylinder head which includes a main combustion space 40, an opening 41 for the pre-chamber 42 and an opening 43 for the spark plug 44. The opening 41 includes a cylindrical portion 45 and a spherically shaped portion 46 which becomes wider in the direction to the main combustion space 40, whereby the pre-chamber 42 constructed corresponding to the opening 41 includes within the area of the main combustion space 40 a spherically shaped closure 47. An opening 49, the so-called firing channel, which connects the pre-chamber combustion space 48 with the main combustion space 40, is provided in the closure 47. Within the spherically shaped portion 46 of the opening 41, the pre-chamber 42 is provided with an opening 50 connecting the opening 43 for the spark plug 44 with the pre-chamber combustion space 48, whereby the opening 43 and the opening 50 have approximately equally large diameters and are arranged approximately aligned to one another. Within the area of the cylindrical portion 45 of the opening 41, the pre-chamber 42 is open at the end face thereof and is threadably connected within this area with the injection nozzle 52 by means of an internal thread 51. At the same time, the pre-chamber 42 is provided within this area with an external thread 53, by which the pre-chamber 42 is fixed in the opening 41 by means of a counter-nut 55 cooperating with a plane 54 of the cylinder head 39 extending at right angle to the injection nozzle center plane C—C, whereby the spherically shaped surface 56 of the pre-chamber 42 comes into abutment at the spherically shaped portion 46 of the opening 41. A nut lock 57 of conventional construction is arranged between the counter-nut 55 and the plane 54 of the cylinder head 39.

In the embodiment of FIG. 4, reference numeral 58 designates a cylinder head which includes a main combustion space 59, an opening 60 for the pre-chamber 61 and an opening 62 for the spark plug 63. The opening 60 includes a cylindrical portion 64 and a spherical portion 65 which becomes wider in the direction toward the main combustion space 59, whereby the pre-chamber 61 constructed corresponding to the opening 60 includes within the area of the main combustion space 59 a spherically shaped closure 66. Two openings 68 and 69, the so-called firing channels, which connect the pre-chamber combustion space 67 with the main combustion space 59 are provided in the closure 66. In the spherical portion 65 of the opening 60, the pre-chamber 61 includes an opening 70 connecting the opening 62 for the spark plug 63 with the pre-chamber combustion space 67, whereby the opening 62 and the opening 70 have approximately equally large diameters and are arranged approximately aligned with respect to one another. Within the area of the cylindrical portion 64 of the opening 60, the pre-chamber 61 is open at the end face thereof and is threadably connected within this area with the injection nozzle 72 by an internal thread 71. At the same time, the pre-chamber 61 includes within this area an external thread 73, by which the pre-chamber is threadably connected with the cylinder head 58. Between the cylindrical portion 64 and the spherically shaped portion 65 of the opening 60, the cylinder head 58 as well as the pre-chamber 61 includes an offset or shoulder 74 and 75, respectively, extending at right angle to the injection nozzle center axis D—D, which come into abutment against one another in the assembled condition of the pre-chamber by interposition of an elastic sealing ring 76.

In the assembled condition of the pre-chambers of FIGS. 1 to 4, during the operation of the internal combustion engine, the combustion pressures on the pre-chamber side are absorbed exclusively by the conical surfaces 8 and 9 (FIG. 1) or 27 and 30 (FIG. 2), the spherical surfaces 46 and 56 (FIG. 3) or the shoulder surfaces 74 and 75 (FIG. 4), without thereby exposing the fastening elements 15 and 17 (FIG. 1), 32 and 36 (FIG. 2), 51 and 55 (FIG. 3) and 73 (FIG. 4) to these combustion pressures. After a completed disassembly, the injection nozzles always assume the same position relative to the corresponding firing channels in case of a renewed assembly by reason of the fastening means which are arranged coaxially to the injection nozzle.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A pre-chamber arrangement in a cylinder head of an internal combustion engine with applied ignition comprising pre-chamber means constructed as a separate structural part in the cylinder head and provided with an opening for a spark plug and with at least one opening leading to the main combustion space, and a fuel-injection nozzle for supplying fuel-air mixture to the pre-chamber, characterized in that the pre-chamber means is arranged in an opening provided in the cylinder head which, at least sectionwise, becomes wider in the direction toward the main combustion space, and in that the pre-chamber means is fixed in the opening by fastening means arranged substantially coaxially to the center plane of the injection nozzle, said pre-chamber means cooperating with the opening in the cylinder head which becomes wider in the direction toward the main combustion space so that combustion pressures of the internal combustion engine are absorbed by the side walls of the opening in the cylinder head.

2. A pre-chamber arrangement according to claim 1, characterized in that the pre-chamber means forms part of a stratified-charge internal combustion engine with applied ignition.

3. A pre-chamber arrangement according to claim 1, characterized in that the opening includes a cylindrical portion, and in that the portion of the opening which becomes wider in the direction toward the main combustion space is constructed substantially conically shaped, and wherein the pre-chamber means is constructed to substantially correspond to the opening and includes within the area of the main combustion space a substantially spherically shaped closure means, said pre-chamber means being open at the end face thereof within the area of the cylindrical portion of the opening, and the pre-chamber means being threadably connected with the injection nozzle within the area of the cylindrical portion by an internal thread thereof and said pre-chamber means being fixed in the opening in said cylinder head by means of a counter-nut cooperating with an external thread on the pre-chamber means and with a plane of the cylinder head extending substantially at right angle to the injection nozzle center plane.

4. A pre-chamber arrangement according to claim 3, characterized in that a nut locking means is arranged between the counter-nut and the plane of the cylinder head.

5. A pre-chamber arrangement according to claim 1, characterized in that the opening includes a cylindrical portion, and in that the portion of the opening which becomes wider in the direction to the main combustion space is constructed substantially conically shaped, and wherein the pre-chamber means is constructed to substantially correspond to the opening and includes within the area of the main combustion space a substantially spherically shaped closure means, said pre-chamber means being open at the end face within the area of the cylindrical portion of the opening, the pre-chamber means being threadably connected with the injection nozzle within the area of the cylindrical portion of the opening by an internal thread and said pre-chamber means being so dimensioned at the end face thereof within the area of the cylindrical portion of the opening that an air gap remains in the assembled condition between a support disk abutting at an offset of the injection nozzle, on the one hand, and a plane of the cylinder head extending substantially at right angle to the injection nozzle center plane, on the other, and the end face of the pre-chamber means so that the pre-chamber is fixed in said opening by the injection nozzle resting on the support disk by means of the offset.

6. A pre-chamber arrangement according to claim 5, characterized in that the pre-chamber means is secured in the circumferential direction within the cylinder head by a locking pin arranged substantially axially parallel to the injection nozzle center plane in the plane formed by the circumferential surface of the pre-chamber means and the circumferential surface of the opening.

7. A pre-chamber arrangement according to claim 1, characterized in that the opening includes a cylindrical portion, and the portion of the opening which becomes wider in the direction toward the main combustion space is constructed substantially spherically shaped, and wherein the pre-chamber means is constructed to substantially correspond to the opening and includes within the area of the main combustion space a substantially spherically shaped closure means, said pre-chamber means being open at the end face within the area of the cylindrical portion of the opening, the pre-chamber means being threadably connected with the injection nozzle within the area of the cylindrical portion of the opening by an internal thread and being fixed in said opening by means of a counter-nut cooperating with an external thread on the pre-chamber means and with a plane of the cylinder head extending substantially at right angle to the injection nozzle center plane.

8. A pre-chamber arrangement according to claim 7, characterized in that a nut locking means is arranged between the counter nut and the plane of the cylinder head.

9. A pre-chamber arrangement according to claim 1, characterized in that the opening includes a cylindrical portion and in that the portion of the opening which becomes wider in the direction toward the main combustion space is constructed substantially spherically shaped, and wherein the pre-chamber means is constructed substantially corresponding to the opening and includes within the area of the main combustion space a substantially spherically shaped closure means, said pre-chamber means being open at the end face thereof within the area of the cylindrical portion of the opening, the pre-chamber means being threadably connected with the injection nozzle within said last-mentioned area by an internal thread and being threadably connected with the cylinder head by an external thread.

10. A pre-chamber arrangement according to claim 9, characterized in that intermediate the cylindrical portion and the spherically shaped portion of the opening, the cylinder head as well as the pre-chamber means are each provided with offset surface means extending substantially at right angle to the injection nozzle center plane which in the assembled condition of the pre-chamber come into abutment at one another by interposition of an elastic sealing ring.

11. A pre-chamber arrangement in a cylinder head of an internal combustion engine with applied ignition comprising pre-chamber means constructed as a separate structural part in the cylinder head and provided with an opening for a spark plug and with at least one opening leading to the main combustion space, and a fuel-injection nozzle for supplying fuel-air mixture to the pre-chamber, characterized in that the pre-chamber means is arranged in an opening provided in the cylinder head which, at least sectionwise, becomes wider in the direction toward the main combustion space, and in that the pre-chamber means is fixed in the opening by fastening means arranged substantially coaxially to the center plane of the injection nozzle, said pre-chamber means cooperating with the opening in the cylinder head which becomes wider in the direction toward the main combustion space so that the fastening means of the pre-chamber means are not exposed to the combustion pressures of the internal combustion engine, the same being absorbed by the side walls of the opening in the cylinder head.

* * * * *